(12) United States Patent
Iden

(10) Patent No.: US 8,413,589 B2
(45) Date of Patent: Apr. 9, 2013

(54) CONTAINER-BASED LOCOMOTIVE POWER SOURCE

(75) Inventor: Michael E. Iden, Kildeer, IL (US)

(73) Assignee: Union Pacific Railroad Company, Omaha, NE (US)

( * ) Notice: Subject to any disclaimer, the term of this patent is extended or adjusted under 35 U.S.C. 154(b) by 413 days.

(21) Appl. No.: 12/393,712

(22) Filed: Feb. 26, 2009

(65) Prior Publication Data

US 2010/0212539 A1   Aug. 26, 2010

(51) Int. Cl.
*B61C 3/00* (2006.01)

(52) U.S. Cl.
USPC .............................................. 105/35; 105/50

(58) Field of Classification Search .................. 104/287, 104/288; 105/26.05, 35, 49–51
See application file for complete search history.

(56) References Cited

U.S. PATENT DOCUMENTS

| | | |
|---|---|---|
| 1,424,849 A | 8/1922 | Pratt |
| 3,847,242 A | 11/1974 | Kappei |
| 5,591,538 A | 1/1997 | Eidler et al. |
| 5,601,943 A | 2/1997 | Eidler et al. |
| RE36,685 E | 5/2000 | Bounds |
| 6,261,714 B1 | 7/2001 | Eidler et al. |
| 6,264,048 B1 * | 7/2001 | Ramnialis et al. ............. 213/1.3 |
| 6,308,639 B1 | 10/2001 | Donnelly |
| 6,455,187 B1 | 9/2002 | Tomazic |
| 6,689,507 B1 | 2/2004 | Tsutsumi |
| 7,056,081 B2 * | 6/2006 | Kelly ......................... 414/792.9 |
| 7,314,761 B2 | 1/2008 | Winter |
| 7,332,236 B2 * | 2/2008 | Ballantine et al. ............ 429/434 |
| 7,430,967 B2 | 10/2008 | Kumar |
| 7,939,190 B2 | 5/2011 | Colello et al. |
| 7,993,932 B2 | 8/2011 | Winter |
| 8,008,808 B2 | 8/2011 | Seeker et al. |
| 8,048,555 B2 | 11/2011 | Darcy et al. |
| 2002/0174798 A1 | 11/2002 | Kumar |
| 2006/0061307 A1 | 3/2006 | Donnelly |
| 2006/0266256 A1 | 11/2006 | Donnelly |
| 2007/0272116 A1 * | 11/2007 | Bartley et al. ................... 105/35 |
| 2008/0246338 A1 | 10/2008 | Donnelly |
| 2008/0270023 A1 | 10/2008 | Kumar |
| 2008/0296970 A1 | 12/2008 | Donnelly |
| 2009/0293759 A1 * | 12/2009 | Schmitz ......................... 105/51 |
| 2010/0188045 A1 | 7/2010 | Colello et al. |
| 2011/0282807 A1 | 11/2011 | Colello et al. |
| 2012/0045669 A1 | 2/2012 | Darcy et al. |

FOREIGN PATENT DOCUMENTS

| | | |
|---|---|---|
| JP | 58-15269 | 10/1983 |
| JP | 2007-236196 A | 9/2007 |
| WO | 2010/042659 A1 | 4/2010 |

OTHER PUBLICATIONS

International Standard, "Series 1 freight containers—Classification, dimensions and ratings", ISO 668, Fifth edition, Dec. 15, 1995.
Product Information Sheet entitled "Hybrid locomotive the future of rail is just around the bend.", General Electric Company, eco-050503, 2005, 2 sheets.

* cited by examiner

*Primary Examiner* — Robert McCarry, Jr.
(74) *Attorney, Agent, or Firm* — Pillsbury Winthrop Shaw Pittman LLP

(57) ABSTRACT

The present invention relates to a container-based locomotive power source that can be readily interchanged.

19 Claims, 4 Drawing Sheets

CONTAINER-BASED LOCOMOTIVE POWER SOURCE

FIELD OF THE INVENTION

The present invention relates to a container-based locomotive power source that can be readily interchanged.

BACKGROUND OF THE INVENTION

The railroad industry has made a number of attempts to provide alternative power sources for powering locomotives, such as railyard switching locomotives and over-the-road (i.e., long haul freight transport) locomotives. Such alternatives seek to reduce or eliminate the reliance on the production of power by combustion of fossil fuel, typically diesel fuel, and the resulting emissions.

The typical locomotive includes an internal combustion diesel engine that powers an AC generator, which in turn is coupled to an AC-DC rectifier to output a DC current. The DC current is delivered to a bus, which distributes the power to individual electric motors (referred to as traction motors) that drive the track engaging wheels of the locomotive. There have also been designs using a DC power generator, which does not require the use of a rectifier. In either approach, the electrical power used to operate the locomotive is generated by the operation of the generator by the engine, which combusts diesel fuel to generate power. This generates unwanted emissions discharged into the atmosphere. Also, fuel costs constitute a significant percentage of a locomotive's operating costs, and fluctuations of fuel costs can have a significant impact on railroad operations.

There are variety of patents related to using electrochemical power sources, such as batteries, to power locomotives. For example, U.S. Patent Application Publication 2007/0272116 A1 to Bartley et al. discloses a hybrid diesel electric-powered locomotive with electrically propelled locomotives and battery cars. The battery cars contain a battery pack which are charged via regenerative braking when the train is descending down a hill. The cars and locomotives are used to provide additional electric power to assist in moving the train uphill.

U.S. Pat. No. 6,308,639 B1 to Donnelly et al. describes a battery for supplying electric energy to traction motors of a locomotive. The battery is periodically charged by a microturbine generator.

U.S. Pat. No. 6,689,507 B1 to Tsutsumi et al. shows in FIG. 38(a) an electric locomotive connected to a power vehicle containing an engine electric generator and a three-dimensional battery therein (see, e.g., column 44, lines 11-60).

U.S. Pat. No. 7,430,967 B2 and U.S. Patent Application Publication 2008/0270023 A1 both to Kumar each discloses a hybrid energy locomotive system with an energy tender vehicle coupled to a locomotive for capturing and regenerating at least a portion of the braking electric energy generated while the locomotive is operated. Alternatively, the energy capture and storage system can be charged by a diesel generator, or by a battery charger at a train yard, for example. The system may be used to drive the traction motors of the locomotive. The system may be connected to the power grid as well.

Indeed, U.S. Pat. No. 1,424,849 evidences efforts at making a locomotive powered by an electrochemical power source (e.g., a battery) dating as far back as 1917 (the patent's filing date).

The present invention endeavors to provide an alternative power source that can store significant amounts of energy and can be easily replaced or recharged.

SUMMARY OF THE INVENTION

One aspect of the invention provides a train with an interchangeable container-based power generating system. The train comprises a locomotive comprising a plurality of track engaging wheels, an electrically powered motor for driving the wheels to cause rolling movement of the locomotive along the track, and a power input electrically coupled to the electrically powered motor for connection to a source external to the locomotive. The train also comprises one or more cars each comprising a plurality of track engaging wheels. The one or more cars are coupled to the locomotive to enable the locomotive to pull the one or more cars along the track. The one or more cars comprises a container receiving car having an upwardly facing bed.

The interchangeable container-based power generating system comprises (i) a container removably received on the upwardly facing bed of the container receiving car; and (ii) an electrochemical power source received in the container and comprising a fuel. The electrochemical power source is configured to generate electrical current by an electrochemical reaction comprising oxidation of the fuel and reduction of an oxidizer. The electrochemical power source comprises a power output for conducting the generated electrical current.

An electrical connector is connected between the power output of the electrochemical power source and the power input of the locomotive to enable the electrical current generated by the electrochemical power source to power the motor of the locomotive. The electrical connector is disconnectable between the power input and the power output. The removability of the container and the disconnectability of the electrical connector enables the interchangeable container-based power generating system to be removed and replaced as a unit.

Another aspect of the invention provides a method for providing a power supply to a train. The train comprises a locomotive comprising a plurality of track engaging wheels, an electrically powered motor for driving the wheels to cause rolling movement of the locomotive along the track, and a power input electrically coupled to the electrically powered motor for connection to a source external to the locomotive. The train also comprises one or more cars each comprising a plurality of track engaging wheels, the one or more cars being coupled to the locomotive to enable the locomotive to pull the one or more cars along the track. The one or more cars comprise a container receiving car having an upwardly facing bed.

The method of this aspect of the invention comprises:

removably mounting to the train an interchangeable container-based power generating system comprising: (i) a container; and (ii) an electrochemical power source received in the container and comprising a fuel source, the electrochemical power source being configured to generate electrical current by an electrochemical reaction comprising oxidation of the fuel and reduction of an oxidizer, the electrochemical power source comprising a power output for conducting the generated electrical current;

the removably mounting comprising removably mounting the container on the upwardly facing bed of the container receiving car; and establishing an electrical connection between the power output of the electrochemical power source and the power input of the locomotive to enable the electrical current generated by the electrochemical power source to power the motor of the locomotive, the electrical connection being disconnectable between the power input and the power output.

Another aspect of the invention provides a method for interchanging a power supply of a train. The train comprises a locomotive comprising a plurality of track engaging wheels, an electrically powered motor for driving the wheels to cause rolling movement of the locomotive along the track, and a power input electrically coupled to the electrically powered motor for connection to a source external to the locomotive. The train also comprises one or more cars each comprising a plurality of track engaging wheels, the one or more cars being coupled to the locomotive to enable the locomotive to pull the one or more cars along the track. The one or more cars comprise a container receiving car having an upwardly facing bed. The train further comprises a first interchangeable container-based power generating system comprising: (i) a first container removably received on the upwardly facing bed of the container receiving car; and (ii) a first electrochemical power source received in the container and comprising a fuel source, the electrochemical power source being configured to generate electrical current by an electrochemical reaction comprising oxidation of the fuel and reduction of an oxidizer. The first electrochemical power source comprises a power output for conducting the generated electrical current. An electrical connector is connected between the power output of the first electrochemical power source and the power input of the locomotive to enable the electrical current generated by the first electrochemical power source to power the motor of the locomotive. The electrical connector is disconnectable between the power input and the power output.

The method of this aspect of the invention comprises:

removing the first interchangeable container-based power generating system from the train as a unit by disconnecting the electrical connector and removing the first container from the container receiving car;

removably mounting to the train a second interchangeable container-based power generating system comprising: (i) a second container; and (ii) a second electrochemical power source received in the container and comprising a fuel source, the second electrochemical power source being configured to generate electrical current by an electrochemical reaction comprising oxidation of the fuel and reduction of an oxidizer, the second electrochemical power source comprising a power output for conducting the generated electrical current;

the removably mounting comprising removably mounting the second container of the second interchangeable container-based power generating system on the upwardly facing bed of the container receiving car;

establishing an electrical connection between the power output of the second electrochemical power source of the second interchangeable container-based power generating system and the power input of the locomotive to enable the electrical current generated by the second electrochemical power source to power the motor of the locomotive, the electrical connection being disconnectable between the power input and the power output.

Another aspect of the present invention provides an interchangeable container-based power generating system for use on a train. The train comprises: (i) a locomotive comprising a plurality of track engaging wheels, an electrically powered motor for driving the wheels to cause rolling movement of the locomotive along the track, and a power input electrically coupled to the electrically powered motor for connection to a source external to the locomotive; (ii) one or more cars each comprising a plurality of track engaging wheels, the one or more cars being coupled to the locomotive to enable the locomotive to pull the one or more cars along the track, said one or more cars comprising a container receiving car having an upwardly facing bed; and (iii) an electrical connector for connection between a power output of the electrochemical power source and the power input of the locomotive to enable electrical current generated by the electrochemical power source to power the motor of the locomotive, the electrical connector being disconnectable between the power input and the power output.

The interchangeable container-based power generating system comprises: a container configured to be removably received on the upwardly facing bed of the container receiving car; and an electrochemical power source received in the container and comprising a fuel. The electrochemical power source is configured to generate electrical current by an electrochemical reaction comprising oxidation of the fuel and reduction of an oxidizer, the electrochemical power source comprising a power output for conducting the generated electrical current. The removability of the container and the disconnectability of the electrical connector enables the interchangeable container-based power generating system to be removed and replaced as a unit.

The container may be an intermodal container, and it may be an ISO container.

Other objects, features and advantages of the present invention will become apparent from the following detailed description, the accompanying drawings, and the appended claims.

DETAILED DESCRIPTION OF THE ILLUSTRATED EMBODIMENT(S) OF THE INVENTION

In general, the present invention relates to a novel alternative electrochemical power source for use in powering a locomotive pulling a train of one or more cars. In particular, the electrochemical power source is part of an interchangeable container-based power generating system, which comprises (i) a container removably received on the upwardly facing bed of a container receiving car; and (ii) the electrochemical power source received in the container, which comprises at least a fuel. The electrochemical power source is configured to generate electrical current by an electrochemical reaction comprising oxidation of the fuel and reduction of an oxidizer. The electrochemical power source comprises a power output for conducting the generated electrical current. An electrical connector is provided to connect the power output to a power input on the locomotive, thus delivering power.

The construction and design of locomotives that use electrical power in place of or in addition to power generated by an internal combustion engine are well known. For example, reference may be made to the following patent documents for teachings of how various aspects of such a locomotive may be constructed: U.S. Pat. Nos. 6,308,639, 7,430,967, and U.S. Patent Publication Nos. 2006-0266256 A1, 2006-0061307 A1, 2007-0272116 A1, 2008-0270023, 2008-0246338 and 2008-0296970. Each of these patents/patent application are hereby incorporated into the present application in their entirety. The present disclosure is focused more particularly on the interchangeable container-based power generating system, and thus the construction of the locomotive itself need not be provided in more detail than necessary. Thus, the details of the locomotive construction will be discussed to the extent required to facilitate an understanding of the structure, operation, and advantages of the interchangeable container-based power generating system.

Figure 1:
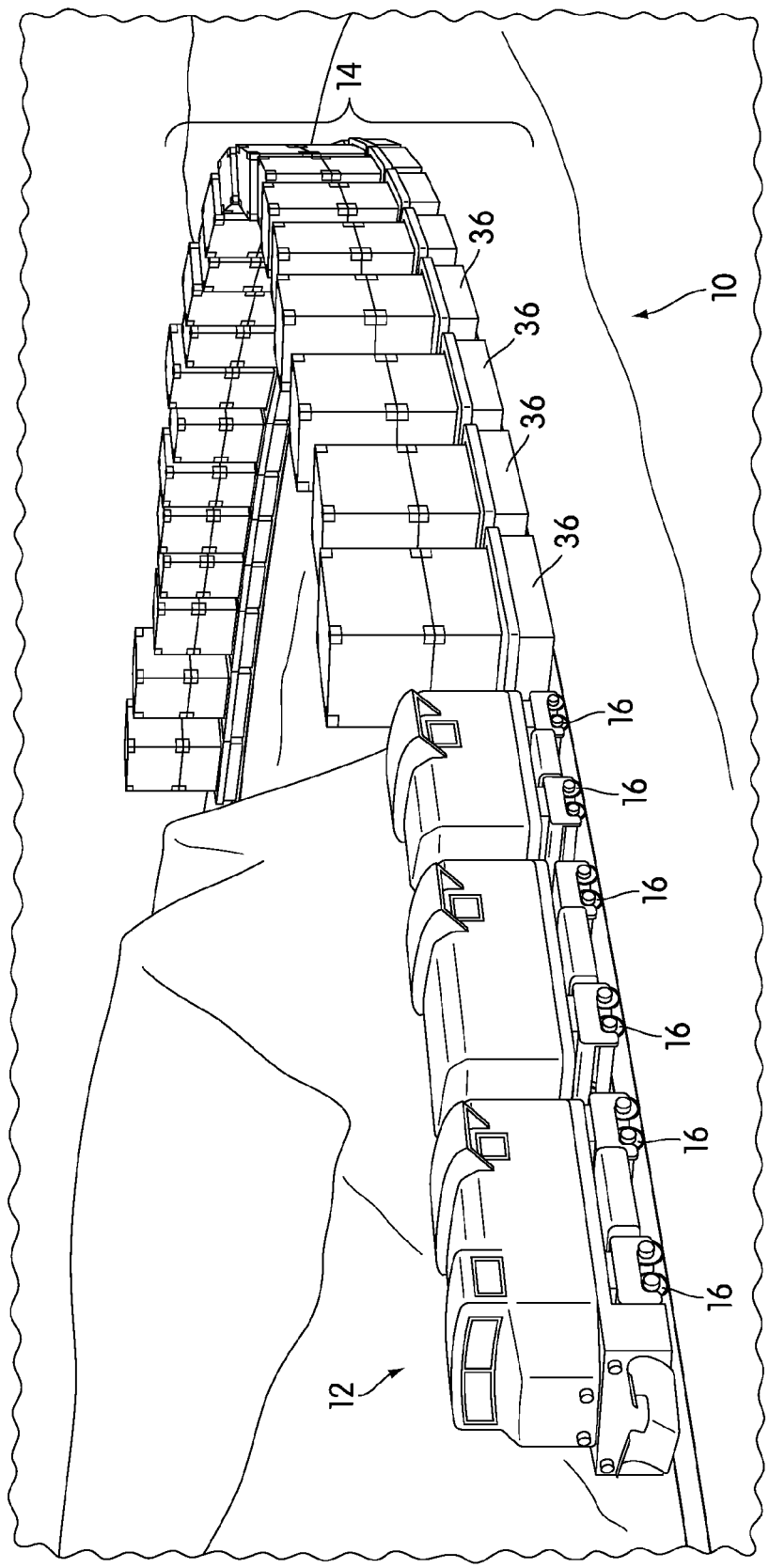
FIG. 1 shows a conventional prior art train.

FIG. 1 shows a conventional train 10 or "consist," which includes a locomotive 12 and a series of cars 14 pulled behind the train. As is standard, the locomotive 12 and cars 14 have track engaging wheels 16 designed to engage a standard railroad track, which has a pair of parallel rails. The locomotive 12 provides the tractive force for pulling the cars 14 coupled behind it. The locomotive 12 depicted is an over-the-road type, meaning that it is designed to pull a large number of cars 14 for a long distance to deliver the cars to a desired location. This is also referred to as a long-haul locomotive and train. However, the aspects of the present invention are not limited to over-the-road type locomotives, and may be applied to any type, including but not limited to switching locomotives. Switching locomotives are used in railyards (also referred to a switching yards) for moving cars for short distances within the yards. Thus, the specific type of locomotive and train to which the present invention is applied is not intended to be limiting.

Figure 2A:
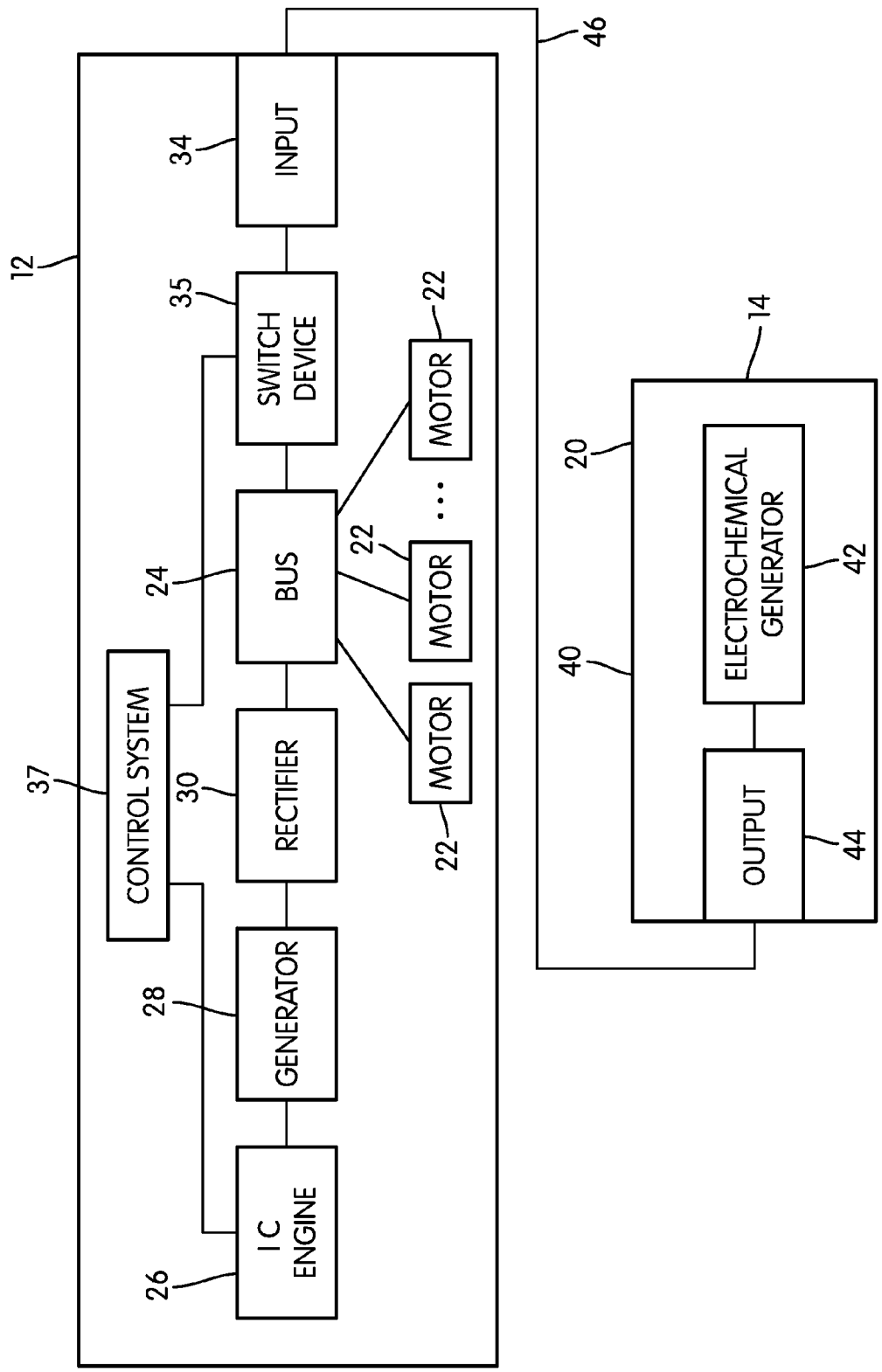
FIG. 2A is a schematic block diagram of the basic components of a train constructed in accordance with the present invention, which includes a locomotive and an interchangeable container-based power generating system, both shown schematically.

FIG. 2A is a schematic block diagram of the basic power generation components of a train constructed in accordance with the present invention, which includes a locomotive 12 and an interchangeable container-based power generating system 20, both shown schematically. The locomotive 12 has an electrically powered motor 22 for driving its wheels 16 to cause rolling movement of the locomotive 12 along the track. Preferably, but not necessarily, a plurality of electrically powered motors 22 are provided for driving the wheels 16. These are often referred to as traction motors, and each one is associated with an individual wheel, or an axle common to two opposed wheels 16. However, it is possible for fewer electrical motors, or just one electrical motor, to be used in conjunction with a mechanical transmission for distributing torque to the wheels. Where a plurality of electrically powered motors are used, the locomotive 12 may optionally further comprise a bus 24 for controlling distribution of electrical current to the electrically powered motors 22.

In some embodiments, the locomotive 12 further comprises an internal combustion engine 26 and an engine-driven power generator 28 coupled to the engine 26. The engine-driven power generator 28 is constructed to be driven by the engine 26 to generate electrical current, and the engine driven power generator 28 is coupled to the electrically powered motor(s), such as through the bus 24. The engine may be of any type, and typically will be a diesel engine, i.e., an engine that operates by combusting diesel fuel, which is commonly known in the art. The generator 28 may likewise be of any type that converts mechanical motion into electrical energy. For example, a rotary AC generator may be coupled to an output shaft of the engine 26. Where an AC generator is used, a rectifier 30 may be coupled to the output of the generator 28 to condition the electrical power, thus converting it from an AC signal to a DC signal for distribution to the motor(s) 22. Where a bus 24 is used, the output of the generator 28 is coupled to the bus 24. In some embodiments, it is possible to use a DC generator, thus avoiding the need for a separate rectifier. Where an internal combustion engine 26 is used, the locomotive 12 is of the "hybrid" type, meaning that it is capable of operating under the power generated by the engine 26, or under power generated electrochemically by the interchangeable container-based power source 20, the details of which will be discussed below.

In some embodiments, multiple internal combustion engines may be used. Such engine may be coupled to and drive its own respective generator. These generators can be DC generators and be connected to a bus that distributes electrical power to the various traction motors. Likewise, these generators can be AC generators connected to individual AC/DC rectifiers, which in turn connect to a bus that distributes electrical power to the various traction motors.

Where an internal combustion engine is used, any type of engine and any suitable way of delivering its power may be used. The examples herein are not limiting.

In other embodiments, the locomotive 12 may be devoid of an internal combustion engine. Thus, the locomotive 12 may be designed so as to run solely on electrical power, such as is generated by the interchangeable container-based power source 20.

The locomotive 12 also comprises a power input 34 electrically coupled to the electrically powered motor(s) for connection to a source external to the locomotive. In the illustrated embodiment, the input 34 is coupled to the bus 24, so as to enable the bus 24 to control distribution of electrical power delivered to the input 34 to the individual motors 22. This input 34 may be of any type, such as any electrical connector terminal for establishing connection of the bus 24/motor(s) 22 to an electrical power source external to the locomotive 12. The terminal may have positive and negative connections, as is well known, which couple to the positive and negative lines of the bus 24 and/or motor(s) 22.

In a hybrid embodiment, or any other embodiment where multiple power sources are used, the locomotive 12 may further comprise a switch device 35 connecting the power input 34 to the bus 24 and/or motor(s) 22. The switch device 35 is operable between a closed condition enabling delivery of electrical current to the bus 24 via the power input 34, and an open position disabling delivery of electrical current to the bus 24 via the power input 34. The locomotive 12 may further comprise a controller 37 configured to control the switch device 35. The controller 37 may also be configured to control the operation of the engine 26 and components thereof.

The construction and implementation of such a controller 37 is well-known. Such controllers are commonly used in hybrid power-systems for controlling or regulating the delivery of power from multiple power sources, including switching between power delivery via an electrochemical power source and power delivery via an internal combustion engine. The above-incorporated patents and applications describe examples of suitable controllers. In general, the controller may be any type of controller, including but not limited to hard-wired circuitry and/or a microprocessor executing machine executable code configured to control such operations. The controller 37 may be coupled to actuators on the engine 26 to control the delivery of fuel and/or the firing of its combustion cycle, and may be coupled to the switch device 35 to move it between the open and closed conditions to regulate the delivery of power from the container-based power generating system 20.

The switch device 35 may be replaced by or supplemented with a regulator configured to regulate the power delivered to bus 24 and/or motor(s) 22. The regulator can be controlled by the controller to supply varying levels of electrical power on-command, which may be used in lieu of or to supplement power generated by operation of the engine 26. The regulator may be included within the bus 24 as a part of its power distribution control as well. Likewise, the switch device may be included within the bus 24 as well.

Figure 2B:
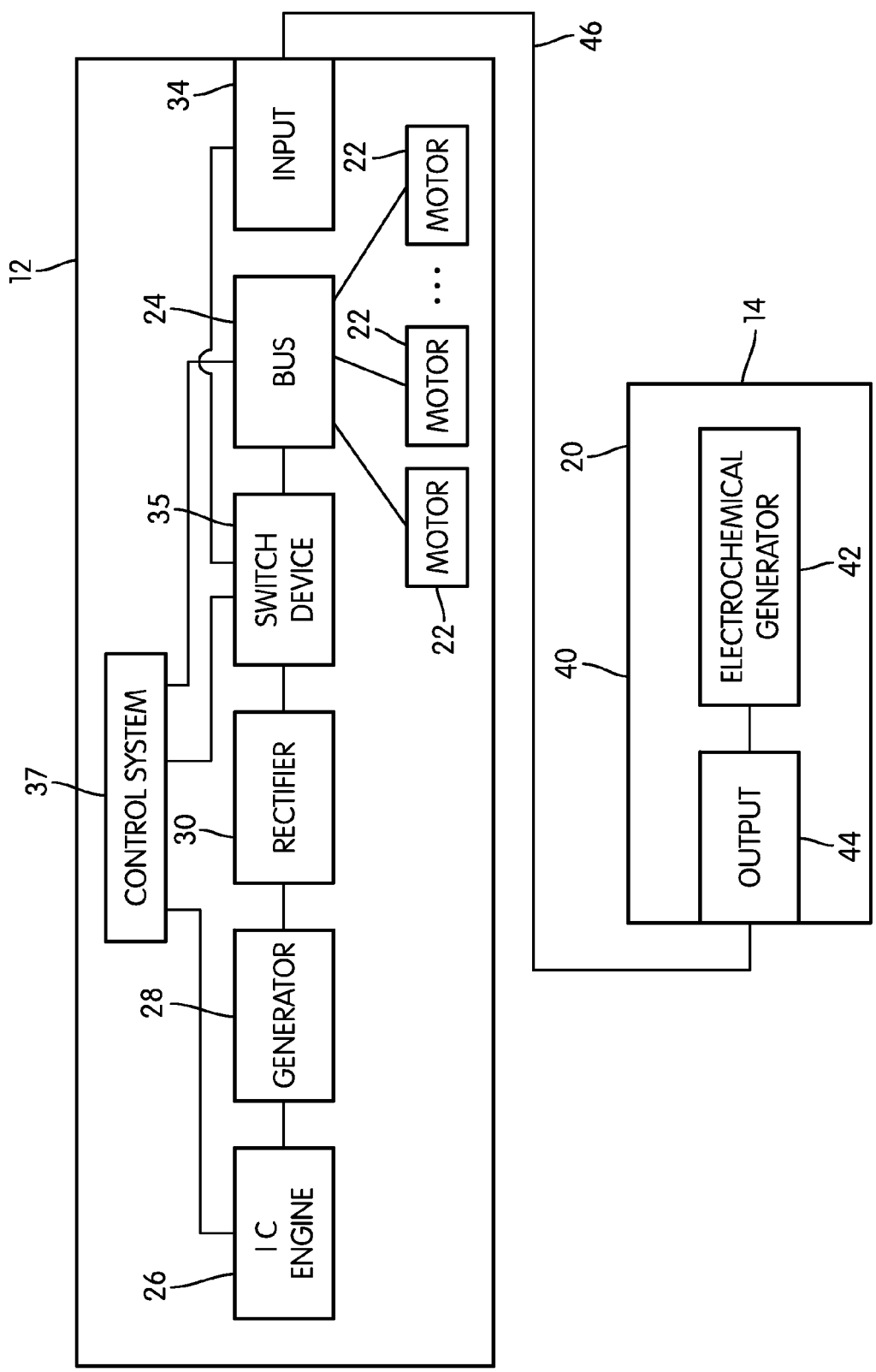
FIG. 2B is a view similar to FIG. 2A, but with an alternative location for a switch device therein.

FIG. 2B shows an alternative location for the switch device 35. In this variation, the switch device 35 toggles between one position delivering power to the bus 24 from the engine/generator/rectifier (or multiple sets of the same) and another position delivering power to the bus 24 from the input 34. The controller 37 may be coupled to the switch device 35 to control its operation.

The one or more cars 14 pulled by the locomotive 12 may comprise a container receiving car 36 having an upwardly facing bed 38.

The interchangeable container-based power generating system 20 comprises (i) a container 40 removably received on the upwardly facing bed 38 of the container receiving car 36; and (ii) an electrochemical power source 42 received in the container 40 and comprising a fuel. The container receiving car 36 with the container 40 will typically be the car immediately behind the locomotive 12, thus replacing the first cargo container car 14 shown in FIG. 1. A non-limiting example of the container receiving car 36 is partially shown in FIG. 3A. But the container receiving car 36 may have any construction and configuration, and may be a standard container receiving car that is of the type that typically carries cargo containers, such as a well car for receiving ISO containers, as is discussed below.

The electrochemical power source 42 may be of any type configured to generate electrical current by an electrochemical reaction comprising oxidation of the fuel and reduction of an oxidizer. The electrochemical power source 42 comprises a power output 44 for conducting the generated electrical current. This output 44 may be of any type, such as any electrical connector terminal for establishing connection of the electrochemical power source 42 to a device external to the container 40. The terminal may have positive and negative connections, as is well known, which are coupled to the positive and negative terminals of the power source 42 (i.e., the cathode and the anode, respectively).

An electrical connector 46 is connected between the power output 44 of the electrochemical power source 42 and the power input 34 of the locomotive 12 to enable the electrical current generated by the electrochemical power source 42 to power the motor(s) 22 of the locomotive 12. This establishes a connection between the power source's power output 44 and the locomotive's power input 34. The electrical connector 46 is disconnectable between the power input 34 and the power output 44. The removability of the container 40 and the disconnectability of the electrical connector 46 enables the interchangeable container-based power generating system 20 to be disconnected, removed and replaced as a unit.

The electrical connector 46 may have any construction or configuration. For example, the electrical connector 46 may includes a flexible conductor. Specifically, the conductor may have a non-conductive insulating sheath or sleeve encasing the positive and negative lines of the connector 46. The flexibility accommodates relative movement between the locomotive 12 and the container 40 and its car 36 as the train 10 travels, particularly around bends. The connector 46 can be connected to the output 44 and input 34 by plugging into a receptacle, or it may be permanently connected to one and plug into a receptacle on the other.

For example, the connector 46 can be fixedly coupled at one end to the input 34, and its opposite end could have a plug (not shown) that removably couples to a receptacle provided on an exterior of the container 40, which provides the coupling to the output 44. Conversely, the connector 46 could be fixedly coupled at one end to the output 44 on the container 40, and could have a plug (not shown) that removably couples to a receptable provided on the locomotive 12, which provides the coupling to input 34. Likewise, the connector 46 could have plugs at each end that removably couple to plugs on both the locomotive 12 and the container 40, thus providing the coupling to both the input 34 and the output 44.

Figure 3A:
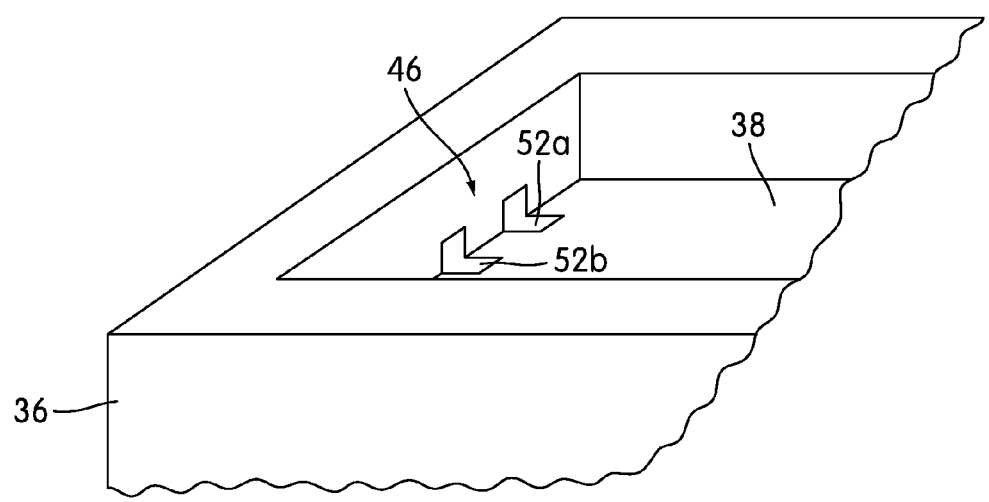
FIG. 3A is a perspective view of part of a container receiving car, showing a well for receiving a container based power generating system and contacts for establishing an electrical connection with the same.
Figure 3B:
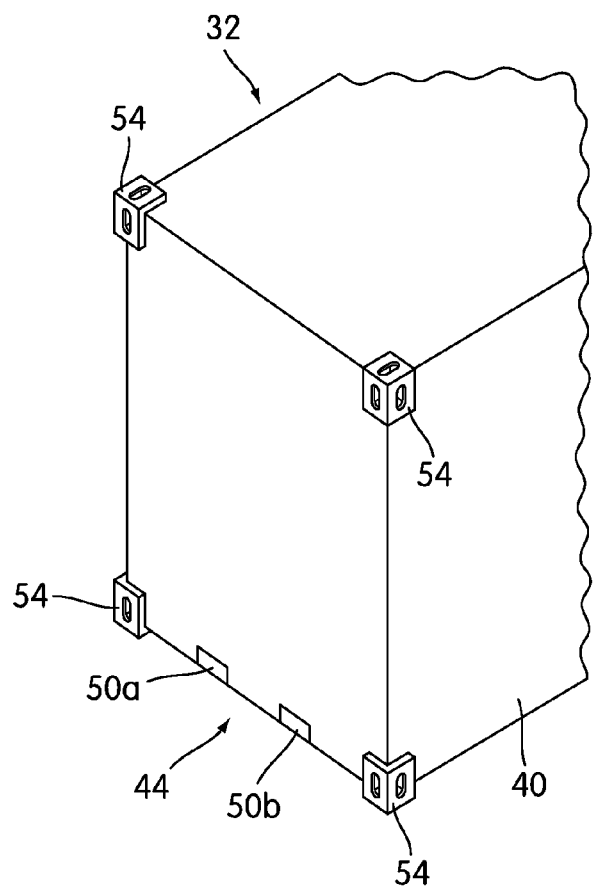
FIG. 3B is a perspective view of part of an ISO container-based power generating system.

FIGS. 3A and 3B show another type of removable connection. In FIGS. 3A and 3B, the output 44 on the container 40 is provided by a pair of positive and negative terminals 50a and 50b provided on a lower edge of the container 40. The connector 46 is connected to the locomotive 12 and its input 34 in any suitable manner, either fixed or removable. The flexible cable of the connector 46 extends between the locomotive 12 and the container-receiving car 36, and is attached to a front part of the car 36. The car 36 includes a pair of positive and negative terminals 52a and 52b located to be contacted by the terminals 50a and 50b on the container 40 when it sits on the bed 38. In the illustrated embodiment, the terminals 52a and 52b are located in the well of the car 36, particularly where the front wall and the bed 38 meet. The terminals 52a and 52b may be regarded as part of the connector 46 as a whole, and the connection is established upon mounting the container 40 to the bed 38, and they are disconnected when the container 40 is removed from the bed 38.

Any other way of establishing a connection between the input 34 and the output 44 may be used, so long as the connector 46 can be disconnected so as to enable the interchangeable container-based power generating system 20 to be removed from its car. Thus, the above-described embodiments are merely examples and are not intended to be limiting.

Preferably, the container 40 is an intermodal container. As used herein, the term "intermodal container" is a standard term in transportation art that refers to a container specifically design for transport by rail, road truck, and ship with standardized sizing and features for accommodating use in each such mode of transportation. More preferably, the container is an ISO container. As used herein, the term "ISO container," or any other reference to a container being ISO compliant or of the ISO type, means that the container has been constructed in accordance with ISO 668 in effect as of the filing date of this application (i.e., ISO 668:1995/ and 2:2005), or as may be modified or supplemented hereafter. A copy of that ISO specification is being filed herewith in an Information Disclosure Statement. Those documents and the standards referenced therein are hereby incorporated herein by reference. Likewise, when the term ISO is used in reference to a railcar or well car, that refers to a car that is designed to removably receive an ISO container.

For example, as can be seen in FIG. 3B, the container 40 has corner brackets 54 that are typically used in ISO containers, typically referred to as corner castings. Such corner brackets have pin receiving holes on the faces thereof for purposes of receiving pins (typically twist pins). These pins may be on lift equipment, thus allowing for standardized equipment to be used to lift the container 40 for removal and replacement thereof. These pins may also be used to interconnect two containers stacked atop one another by engaging the corner brackets 54 of each. Likewise, the pins may used on road truck chasses to secure the container 40 in place, and similar pins may be used in stacking or securing containers aboard a ship. These features are well-known, and common on ISO containers.

Similarly, the container receiving car 36 is preferably a well car with walls extending upwardly from the upwardly facing bed 38. Preferably, the container receiving car 36 is also constructed to receive ISO containers.

The electrochemical power source 42 is contained within the container 40. Preferably, the power source 42 is selected from the group consisting of a fuel cell, a flow battery and a battery. In some embodiments, the container-based power generating system 20 comprises a fuel storage tank (not shown) within the container 40, and the fuel is a fluid stored in the storage tank. In other embodiments, the fuel of the electrochemical power source 42 may comprises a metal fuel in solid form.

In some embodiments, the container-based power generating system 20 may farther comprise an oxidizer stored in an oxidizer storage tank (not shown) that is located in the container 40. Thus, the oxidizer would be self-contained within the system 20. The oxidizer could be liquid or gaseous, and may take any form.

In other embodiments, the electrochemical power source 42 may include an air breathing cathode for exposure to ambient air for enabling ambient oxygen to be the oxidizer. This is advantageous, as it avoids the need for storing the oxidizer, and allows the oxygen in the ambient air to be used for the oxidizer reduction reaction. To facilitate delivery of the ambient air to the cathode, the container 40 may have one or more ports open to an exterior thereof for enabling ambient air to enter the container 40. This is advantageous, as it allows an air-breathing cathode to be used, but avoids having it exposed to the exterior of the container 40. It is also possible for the air-breathing cathode to be exposed to an exterior of the container 40 as well.

One advantage of the interchangeable container-based power generating system 20 is that it is removable and replaceable as a unit. This allows the system 20 to be removed and re-charged separately from the train. The system 20 can be replaced with another system 20, thus allowing the train to continue operating under power. The system 20 can be removed and replaced using standard equipment found in most train yards, such as standard lift equipment used for removing and loading cargo-bearing containers of similar or identical dimensions or configurations, including ISO compliant containers.

Thus, the present application also includes the method providing a power supply to a train comprising: removably mounting to the train 10 the interchangeable container-based power generating system 20, wherein the removably mounting comprises removably mounting the container 40 on the upwardly facing bed 38 of the container receiving car 36; and establishing an electrical connection between the power output 44 of the electrochemical power source 42 and the power input 34 of the locomotive 12 to enable the electrical current generated by the electrochemical power source 42 to power the motor 22 of the locomotive 12, the electrical connection being disconnectable between the power input 34 and the power output 44.

The present application also includes a method for interchanging a power supply of a train comprising: removing a first interchangeable container-based power generating system 20 from the train 10 as a unit by disconnecting the electrical connector 46 and removing the first container 40 from the container receiving car 36; removably mounting to the train 10 a second interchangeable container-based power generating system 20, wherein the removably mounting comprises removably mounting the second container 40 of the second interchangeable container-based power generating system 20 on the upwardly facing bed 38 of the container receiving car 36; and establishing an electrical connection between the power output 44 of the second electrochemical power source 42 of the second interchangeable container-based power generating system 20 and the power input 34 of the locomotive 12 to enable the electrical current generated by the second electrochemical power source 42 to power the motor 22 of the locomotive 12, the electrical connection being disconnectable between the power input 34 and the power output 44. The terms first and second are used in this context for convenience to distinguish between the one being removed and the one being used as the replacement, and are not intended to be limiting in any particular way.

When a system 20 is removed from a train 10, it can be re-charged using any suitable power source. For example, the power source 42 of the system 20 could be coupled to a wide area electrical grid, and be re-charged using standardly available electricity.

As a further energy-saving technique, the power source 42 of the system 20 could be coupled to a "load-testing" station for re-charging. A load-testing station is a station used in train yards in which locomotives are periodically tested. During such testing, a locomotive is typically run at a high RPM for a significant period of time, such as 2 or more hours, and various checks are performed to ensure that it is operating properly. These tests are conducted at various times throughout the year for each locomotive. However, in typical testing at these stations, the locomotive is generating a high amount of power, but not traveling. To allow for this, the generator 28 of the locomotive 12 is typically shunted to a large resistive heat bank, whereby the electrical power generated is dissipated as heat via the resistance. This heat bank may be a separate structure, or incorporated into an external part of the locomotive, such as its roof. With the present invention, the electrical generator 28 could instead be coupled to a terminal, which in turn couples to recharging terminals for one or more of the interchangeable container-based power generating systems 20, thus allowing for this otherwise wasted energy to be used productively for re-charging purposes.

Another advantage of the interchangeable container-based power generating system 20 is that the container 40 used can be very large, and space issues are greatly reduced. For example, standard ISO containers can be up to 53 feet long, and are typically 40 or 45 feet long. Such containers are also typically 8 feet wide, and 8½ or 9½ feet high (other dimensions of course may be used). Because the power source 42 is incorporated into the container 40, rather than into the locomotive itself, the locomotive 12 does not require significant modification, and space constraints are much less of an issue. With greater freedom in terms of space, the power source 42 can include large fuel supplies and/or larger and more complex systems that provide for high power or energy output.

For example, flow batteries are capable of providing high power output, but they require a significant amount of space in terms of power density (i.e., the amount of power that can be delivered compared with the volume occupied by the power source). Flow batteries typically requires flow generation equipment to drive a flow of a liquid based fuel (which may be a liquid fuel, or a solid fuel suspended in a liquid electrolyte) and/or electrolyte. Similarly, liquid oxidizers enhance power output, but likewise require additional space for storage. By taking advantage of the space afforded by a separate container, rather than the limited space available in conventional locomotives, the container-based power generating system can provide a significantly higher amount of power, and more complex systems like flow batteries can be used.

Of course, the power source 42 could also be a fuel cell or battery, both different types of electrochemical power sources.

Preferably, the power source 42 generates power through an electrochemical reaction that is reversible, thus allowing the fuel and/or oxidizer to be re-generated by applying an electrical current to its power output (or possibly to a separate input dedicated to re-charging purposes). For example, where a metal fuel is used, the metal oxide by-product may be reversible, and thus can be stored and re-constituted as the fuel by a reverse reaction during re-charging.

Alternatively, the recharging of the power source 42 need not be accomplished by supplying electricity, and the power source may be re-charged by the addition of more fuel and/or oxidizer. For example, a fuel cell using a hydrocarbon fuel may be re-charged by supplying additional fuel to a fuel tank. Thus, the term re-charging should be broadly understood as including any method of re-constituting the supply(ies) of fuel and/or oxidizer, whether by the addition of more fuel, or re-charging of the fuel and/or oxidizer by an electrochemical reaction driven by the use of an external source of electrical power.

During operation of the train, the power source 42 may also be re-charged by dynamic regenerative braking. This is a known technology that converts the heat generated by mechanical braking into electricity to re-charge an electrochemical power source, or uses the electricity generated when electrical motor resistance is used as the braking for the same purpose. Such technology is known and mentioned in the above-incorporated patent documents, and need not be repeated in detail herein.

The power source 42 is not intended to be limited to the examples described herein, and any other power source that generates power by an electrochemical reaction may be used. The advantage of electrochemical power is that it typically generates little or no carbon emissions, and can provide power to the locomotive with a lower emissions "footprint" on the environment.

The principles of the present invention may be especially advantageous for switching locomotives, which typically operate within a single railyard for moving railcars and locomotives about the yard. Because switching locomotives are designed for short-distance use, and repeated starting and stopping, they typically remain in the same yard. Thus, they can typically remain in close proximity to a station for removing and replacing the interchangeable power-generating system 20. Also, switching locomotives tend to operate at low speeds, and have more frequent idle times, and thus electrochemically generated power is an advantageous energy source.

The principles of the present invention may also be useful for long-haul or "over-the-road" locomotives. With an over-the-road locomotive, it is possible to establish stations along particularly long stretches of rail at which a discharged power generating system 20 can be removed or replaced. Also, in addition to that or as an alternative, the train 10 pulled by an over-the-road locomotive 12 can incorporated a plurality of power systems 20 in the cars 36 pulled immediately behind the locomotive 12. This can be used to increase the overall energy available for the locomotive to use of long haul trips.

The foregoing embodiments have been provided solely to illustrate the structural and functional principles of the present invention, and are in no way intended to be limiting. To the contrary, the present invention in intended to encompass all substitutions, alterations, and modifications within the spirit and scope of the following claims.

What is claimed:
1. A train comprising:
a locomotive comprising a plurality of track engaging wheels, an electrically powered motor for driving the wheels to cause rolling movement of the locomotive along the track, and a power input electrically coupled to the electrically powered motor for connection to a source external to the locomotive;
one or more cars each comprising a plurality of track engaging wheels, the one or more cars being coupled to the locomotive to enable the locomotive to pull the one or more cars along the track, said one or more cars comprising a container receiving car having an upwardly facing bed;
an interchangeable container-based power generating system comprising:
(i) an intermodal container removably received on the upwardly facing bed of the container receiving car, the intermodal container comprising corner brackets with pin receiving holes; and
(ii) an electrochemical power source received in the intermodal container and comprising a fuel, the electrochemical power source being configured to generate electrical current by an electrochemical reaction comprising oxidation of the fuel and reduction of an oxidizer, the electrochemical power source comprising a power output for conducting the generated electrical current, the power output of the electrochemical power source comprising positive and negative contacts on an exterior of the intermodal container, the positive and negative contacts on the exterior of the intermodal container being coupled to a cathode and an anode, respectively, of the electrochemical power source, and the positive and negative contacts being coupled to positive and negative lines of the electrical motor; and
an electrical connector connected between the power output of the electrochemical power source and the power input of the locomotive to enable the electrical current generated by the electrochemical power source to power the motor of the locomotive, the electrical connector comprising corresponding positive and negative contacts on the container receiving car to those on the exterior of the intermodal container, the electrical connector being disconnectable between the power input and the power output;
wherein the removability of the intermodal container and the disconnectability of the electrical connector enables the interchangeable container-based power generating system to be removed and replaced as a unit,
wherein the corresponding positive and negative contacts on the exterior of the intermodal container and on the container receiving car are engaged to establish the connection of the electrical connector between the power output of the electrochemical power source and the power input of the locomotive, and
wherein the corresponding positive and negative contacts on the exterior of the intermodal container and on the container receiving car contacts are configured to be disengaged upon removal of the intermodal container from the container receiving car to affect disconnection of the electrical connector between the power input and the power output.

2. A train according to claim 1, wherein the locomotive comprises a plurality of electrically powered motors for driving the wheels.

3. A train according to claim 2, wherein the locomotive further comprises a bus for controlling distribution of electrical current to the electrically powered motors, the power input being coupled to the bus.

4. A train according to claim 3, wherein the locomotive further comprises an internal combustion engine and an engine-driven power generator coupled to the engine, the engine-driven power generator being constructed to be driven by the engine to generate electrical current, wherein the engine driven power generator is coupled to the bus.

5. A train according to claim 4, wherein the locomotive further comprises a switch device connecting the power input to the bus, the switch device being operable between a closed condition enabling delivery of electrical current to the bus via the power input and an open position disabling delivery of electrical current to the bus via the power input.

6. A train according to claim 5, wherein the locomotive further comprises a controller configured to control the switch device.

7. A train according to claim 6, wherein the controller is also configured to control the operation of the engine.

8. A train according to claim 1, wherein the locomotive is devoid of an internal combustion engine.

9. A train according to claim 1, wherein the electrochemical power source is selected from the group consisting of a fuel cell, a flow battery and a battery.

10. A train according to claim 1, wherein the container-based power generating system comprises a fuel storage tank within the intermodal container, the fuel being a fluid stored in the storage tank.

11. A train according to claim 1, wherein the fuel of the electrochemical power source comprises a metal fuel.

12. A train according to claim 1, wherein the container-based power generating system further comprises an oxidizer stored in an oxidizer storage tank.

13. A train according to claim 1, wherein the electrochemical power source has an air breathing cathode for exposure to ambient air for enabling ambient oxygen to be the oxidizer.

14. A train according to claim 13, wherein the intermodal container has one or more ports open to an exterior thereof for enabling ambient air to enter the intermodal container.

15. A train according to claim 1, wherein the electrical connector includes a flexible conductor.

16. A train according to claim 1, wherein the electrical connector includes a flexible conductor connected between the terminal thereof on the container receiving car and the power input of the locomotive.

17. A method for providing a power supply to a train, the train comprising: (a) a locomotive comprising a plurality of track engaging wheels, an electrically powered motor for driving the wheels to cause rolling movement of the locomotive along the track, and a power input electrically coupled to the electrically powered motor for connection to a source external to the locomotive; and (b) one or more cars each comprising a plurality of track engaging wheels, the one or more cars being coupled to the locomotive to enable the locomotive to pull the one or more cars along the track, said one or more cars comprising a container receiving car having an upwardly facing bed, the container receiving car comprising positive and negative contacts;

the method comprising:

removably mounting to the train an interchangeable container-based power generating system comprising: (i) an intermodal container comprising corner brackets with pin receiving holes; and (ii) an electrochemical power source received in the intermodal container and comprising a fuel source, the electrochemical power source being configured to generate electrical current by an electrochemical reaction comprising oxidation of the fuel and reduction of an oxidizer, the electrochemical power source comprising a power output for conducting the generated electrical current, the power output of the electrochemical power source comprising positive and negative contacts on an exterior of the intermodal container corresponding to the positive and negative contacts on the container receiving car, the positive and negative contacts on the exterior of the intermodal container being coupled to a cathode and an anode, respectively, of the electrochemical power source, and the positive and negative contacts configured to be coupled to positive and negative lines of the electrical motor;

said removably mounting comprising removably mounting the intermodal container on the upwardly facing bed of the container receiving car, the positive and negative contacts on the exterior of the intermodal container and on the container receiving car configured to be engaged to establish the connection of the electrical connector between the power output of the electrochemical power source and the power input of the locomotive; and establishing an electrical connection between the power output of the electrochemical power source and the power input of the locomotive to enable the electrical current generated by the electrochemical power source to power the motor of the locomotive, the electrical connection being disconnectable between the power input and the power output, the corresponding positive and negative contacts on the exterior of the intermodal container and on the container receiving car configured to be disengaged upon removal of the intermodal container from the container receiving car to affect disconnection of the electrical connector between the power input and the power output.

18. A method for interchanging a power supply of a train, the train comprising: (a) a locomotive comprising a plurality of track engaging wheels, an electrically powered motor for driving the wheels to cause rolling movement of the locomotive along the track, and a power input electrically coupled to the electrically powered motor for connection to a source external to the locomotive; (b) one or more cars each comprising a plurality of track engaging wheels, the one or more cars being coupled to the locomotive to enable the locomotive to pull the one or more cars along the track, said one or more cars comprising a container receiving car having an upwardly facing bed; (c) a first interchangeable container-based power generating system comprising: (i) a first intermodal container removably received on the upwardly facing bed of the container receiving car, the first intermodal container comprising corner brackets with pin receiving holes; and (ii) a first electrochemical power source received in the first intermodal container and comprising a fuel source, the electrochemical power source being configured to generate electrical current by an electrochemical reaction comprising oxidation of the fuel and reduction of an oxidizer, the first electrochemical power source comprising a power output for conducting the generated electrical current, the power output of the electrochemical power source comprising positive and negative contacts on an exterior of the first intermodal container, the positive and negative contacts on the exterior of the first intermodal container being coupled to a cathode and an anode, respectively, of the electrochemical power source, and the positive and negative contacts being coupled to positive and negative lines of the electrical motor; and (d) an electrical connector connected between the power output of the first electrochemical power source and the power input of the locomotive to enable the electrical current generated by the first electrochemical power source to power the motor of the locomotive, the electrical connector comprising corresponding positive and negative contacts on the container receiving car to those on the exterior of at least the first intermodal container, the electrical connector being disconnectable between the power input and the power output;

the method comprising:

removing the first interchangeable container-based power generating system from the train as a unit by disconnecting the electrical connector and removing the first intermodal container from the container receiving car, the corresponding positive and negative contacts on the exterior of the first intermodal container and on the container receiving car being disengaged upon removal of the first intermodal container from the container receiving car to affect disconnection of the electrical connector between the power input and the power output;

removably mounting to the train a second interchangeable container-based power generating system comprising: (i) a second intermodal container; and (ii) a second electrochemical power source received in the second intermodal container and comprising a fuel source, the second electrochemical power source being configured to generate electrical current by an electrochemical reaction comprising oxidation of the fuel and reduction of an oxidizer, the second electrochemical power source comprising a power output for conducting the generated electrical current, the power output of the electrochemical power source comprising positive and negative contacts on an exterior of the second intermodal container, the positive and negative contacts on the exterior of the second intermodal container being coupled to a cathode and an anode, respectively, of the electrochemical power source, and the positive and negative contacts being coupled to positive and negative lines of the electrical motor;

said removably mounting comprising removably mounting the second intermodal container of the second interchangeable container-based power generating system on the upwardly facing bed of the container receiving car;

establishing an electrical connection between the power output of the second electrochemical power source of the second interchangeable container-based power generating system and the power input of the locomotive to enable the electrical current generated by the second electrochemical power source to power the motor of the locomotive, the corresponding positive and negative contacts on the container receiving car corresponding to those on the exterior of the second intermodal container such that the positive and negative contacts on the exterior of the second intermodal container and on the container receiving car are engaged to establish the connection of the electrical connector between the power output of the electrochemical power source and the power input of the locomotive, the electrical connection being disconnectable between the power input and the power output.

19. An interchangeable container-based power generating system for use on a train, the train comprising: (i) a locomotive comprising a plurality of track engaging wheels, an electrically powered motor for driving the wheels to cause rolling movement of the locomotive along the track, and a power input electrically coupled to the electrically powered motor for connection to a source external to the locomotive; (ii) one or more cars each comprising a plurality of track engaging wheels, the one or more cars being coupled to the locomotive to enable the locomotive to pull the one or more cars along the track, said one or more cars comprising a container receiving car having an upwardly facing bed; and (iii) an electrical connector for connection between a power output of the electrochemical power source and the power input of the locomotive to enable electrical current generated by the electrochemical power source to power the motor of the locomotive, the electrical connector comprising positive and negative contacts on the container receiving car, the electrical connector being disconnectable between the power input and the power output;

the interchangeable container-based power generating system comprising:

an intermodal container configured to be removably received on the upwardly facing bed of the container receiving car, the intermodal container comprising corner brackets with pin receiving holes; and an electrochemical power source received in the intermodal container and comprising a fuel, the electrochemical power source being configured to generate electrical current by an electrochemical reaction comprising oxidation of the fuel and reduction of an oxidizer, the electrochemical power source comprising a power output for conducting the generated electrical current, the power output of the electrochemical power source comprising positive and negative contacts on an exterior of the intermodal container corresponding to the positive and negative contacts on the container receiving car, the positive and negative contacts on the exterior of the intermodal container being coupled to a cathode and an anode, respectively, of the electrochemical power source, and the positive and negative contacts configured to be coupled to positive and negative lines of the electrical motor;

wherein the removability of the intermodal container and the disconnectability of the electrical connector enables the interchangeable container-based power generating system to be removed and replaced as a unit, and wherein the positive and negative contacts on the exterior of the intermodal container and on the container receiving car are configured to be engaged to establish the connection of the electrical connector between the power output of the electrochemical power source and the power input of the locomotive, and wherein the corresponding positive and negative contacts on the exterior of the intermodal container and on the container receiving car are configured to be disengaged upon removal of the intermodal container from the container receiving car to affect disconnection of the electrical connector between the power input and the power output.

* * * * *